(12) United States Patent
Zhang et al.

(10) Patent No.: US 11,283,348 B2
(45) Date of Patent: Mar. 22, 2022

(54) VOLTAGE REGULATOR HAVING A PLURALITY OF INPUT SWITCH CIRCUITS

(71) Applicant: Silergy Semiconductor Technology (Hangzhou) LTD, Hangzhou (CN)

(72) Inventors: Wang Zhang, Hangzhou (CN); Chen Zhao, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 16/106,323

(22) Filed: Aug. 21, 2018

(65) Prior Publication Data
US 2019/0058396 A1 Feb. 21, 2019

(30) Foreign Application Priority Data
Aug. 21, 2017 (CN) .......................... 201710720368.9

(51) Int. Cl.
*H02M 3/07* (2006.01)

(52) U.S. Cl.
CPC ..................................... *H02M 3/07* (2013.01)

(58) Field of Classification Search
CPC ............ H02M 3/02; H02M 3/04; H02M 3/06; H02M 3/07; H02M 3/073; H02M 3/10; H02M 3/145; H02M 3/155; H02M 3/156; H02M 3/158; H02M 3/1584; H02M 3/33507; H02M 1/08; H02M 1/088; H02M 2001/0067; H02M 2001/007; H02M 2001/008; H02M 2003/071; H02M 2003/072; H02M 2003/075; H02M 2003/076; H02M 2003/077; H02M 2003/078; H02M 1/0067; H02M 1/007; H02M 1/008; H02M 3/00; H02M 3/071–078; H02M 1/0085; H02M 1/0095; H05B 33/0806; H05B 33/0809; H05B 33/0812; H05B 33/0815; H05B 33/0818; G05F 1/10; G05F 1/46; G05F 1/56; G05F 3/02; G05F 3/08; G05F 3/10; G05F 3/16;
(Continued)

(56) References Cited

U.S. PATENT DOCUMENTS 8,687,382 B2   4/2014   Chen
9,295,116 B2   3/2016   Sanders et al.
(Continued)

FOREIGN PATENT DOCUMENTS

JP      2001238463 A   *   8/2001

OTHER PUBLICATIONS

English translation of JP 2001238463. (Year: 2001).*

*Primary Examiner* — Thienvu V Tran
*Assistant Examiner* — Carlos O Rivera-Perez

(57) ABSTRACT

A voltage regulator can include: N energy storage capacitors, each having first nodes connected together, where N is a positive integer; N input capacitors connected in series between two nodes of an input port; N input switch circuits, each being connected in parallel with a corresponding one of the N input capacitors, where each of the N input switch circuits is configured to selectively couple a second node of a corresponding one of the N energy storage capacitors to a first node or a second node of the corresponding input capacitor; and a first output switch circuit configured to selectively couple the first nodes of the N energy storage capacitors to a first node or a second node of an output port.

17 Claims, 19 Drawing Sheets

(58) Field of Classification Search
CPC ... G05F 3/00; G05F 3/185; G05F 3/22; G05F 3/227; G05F 3/24; G05F 3/247; G05F 1/00; G05F 1/12; G05F 1/40; G05F 1/44; G05F 1/45; G05F 1/575
USPC ........ 323/222–226, 266, 268–275, 282–285, 323/288, 351; 363/15–17, 59–62, 363/123–127; 307/108–110; 320/166, 320/167
See application file for complete search history.

(56) References Cited

U.S. PATENT DOCUMENTS

| | | |
|---|---|---|
| 9,473,034 B2 | 10/2016 | Huang et al. |
| 9,627,972 B2 | 4/2017 | Mao et al. |
| 9,762,128 B2 | 9/2017 | Zhang et al. |
| 2008/0158915 A1* | 7/2008 | Williams ................ H02M 3/07 363/21.06 |
| 2014/0346962 A1* | 11/2014 | Sanders ............. H05B 33/0815 315/193 |
| 2016/0072312 A1* | 3/2016 | Ichikawa ............ H02M 3/1582 307/104 |
| 2016/0315545 A1* | 10/2016 | Kovacevic ........ H02M 3/33553 |
| 2018/0198367 A1 | 7/2018 | Zhang et al. |
| 2018/0205315 A1* | 7/2018 | Giuliano ............... H02M 3/073 |

* cited by examiner

US 11,283,348 B2

VOLTAGE REGULATOR HAVING A PLURALITY OF INPUT SWITCH CIRCUITS

RELATED APPLICATIONS

This application claims the benefit of Chinese Patent Application No. 201710720368.9, filed on Aug. 21, 2017, which is incorporated herein by reference in its entirety.

FIELD OF THE INVENTION

The present invention generally relates to the field of power electronics, and more particularly to voltage regulators.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
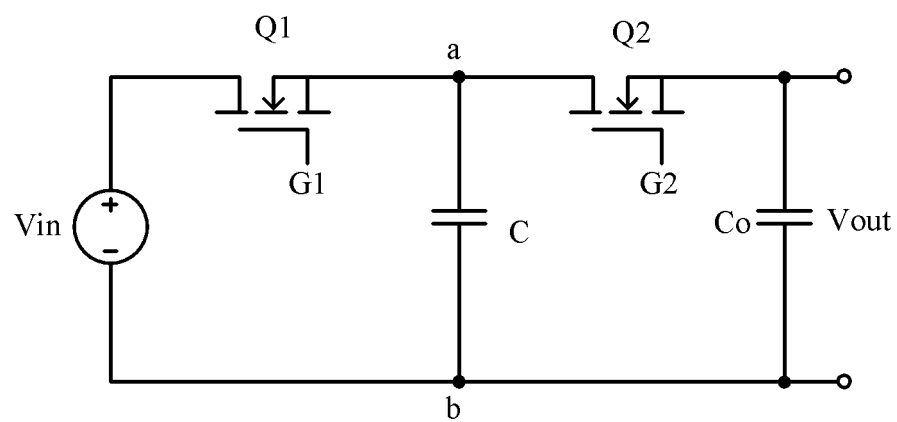
FIG. 1 is a schematic block diagram of an example switched capacitor converter.
Figure 2:
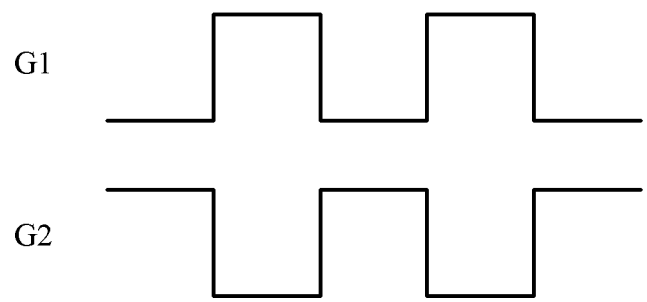
FIG. 2 is a waveform diagram of example operation of the switched capacitor converter of FIG. 1.

Referring now to FIG. 1, shown is a schematic block diagram of an example switched capacitor converter. Referring also to FIG. 2, shown is a waveform diagram of example operation of the switched capacitor converter of FIG. 1. A switched capacitor converter may realize voltage or current conversion by controlling the charge and discharge of capacitors through switches. Here, an input port can receive input voltage Vin. Switch Q1 can connect between node "a" of capacitor C and a first node of a voltage input port, and may be turned on and off under the control of control signal G1. Switch Q2 can connect between node "a" of capacitor C and a first node of an output port, and can be turned on and off under the control of control signal G2. Also control signals G1 and G2 may be complementary, such that when control signal G1 is high, control signal G2 is low, and vice versa.

Node "b" of capacitor C can connect to a second node of the input port and a second node of the output port. The second node of the input port and the second node of the output port may be a reference node (e.g., a ground node). Output capacitor Co can also be configured in the output port to smooth output voltage Vout. Thus, capacitor C May intermittently discharge to the output port by alternately turning switches Q1 and Q2 on and off, thereby realizing power transmission and voltage/current conversion. However, in this structure, the input port and the output port share a common ground, and capacitor C intermittently outputs an output current to the output port, which can lead to larger undesirable current pulsation on an input source and the output capacitor. Further, this example isolated converter may utilize coils with a larger volume that is not conducive to a miniaturized system.

In one embodiment, a voltage regulator can include: (i) N energy storage capacitors, each having first nodes connected together, where N is a positive integer; (ii) N input capacitors connected in series between two nodes of an input port; (iii) N input switch circuits, each being connected in parallel with a corresponding one of the N input capacitors, where each of the N input switch circuits is configured to selectively couple a second node of a corresponding one of the N energy storage capacitors to a first node or a second node of the corresponding input capacitor; (iv) a first output switch circuit configured to selectively couple the first nodes of the N energy storage capacitors to a first node or a second node of an output port; and (v) where the N input switch circuits and the first output switch circuit are controlled to switch among different states such that an output voltage of the voltage regulator is proportional to an input voltage of the voltage regulator.

Figure 3:
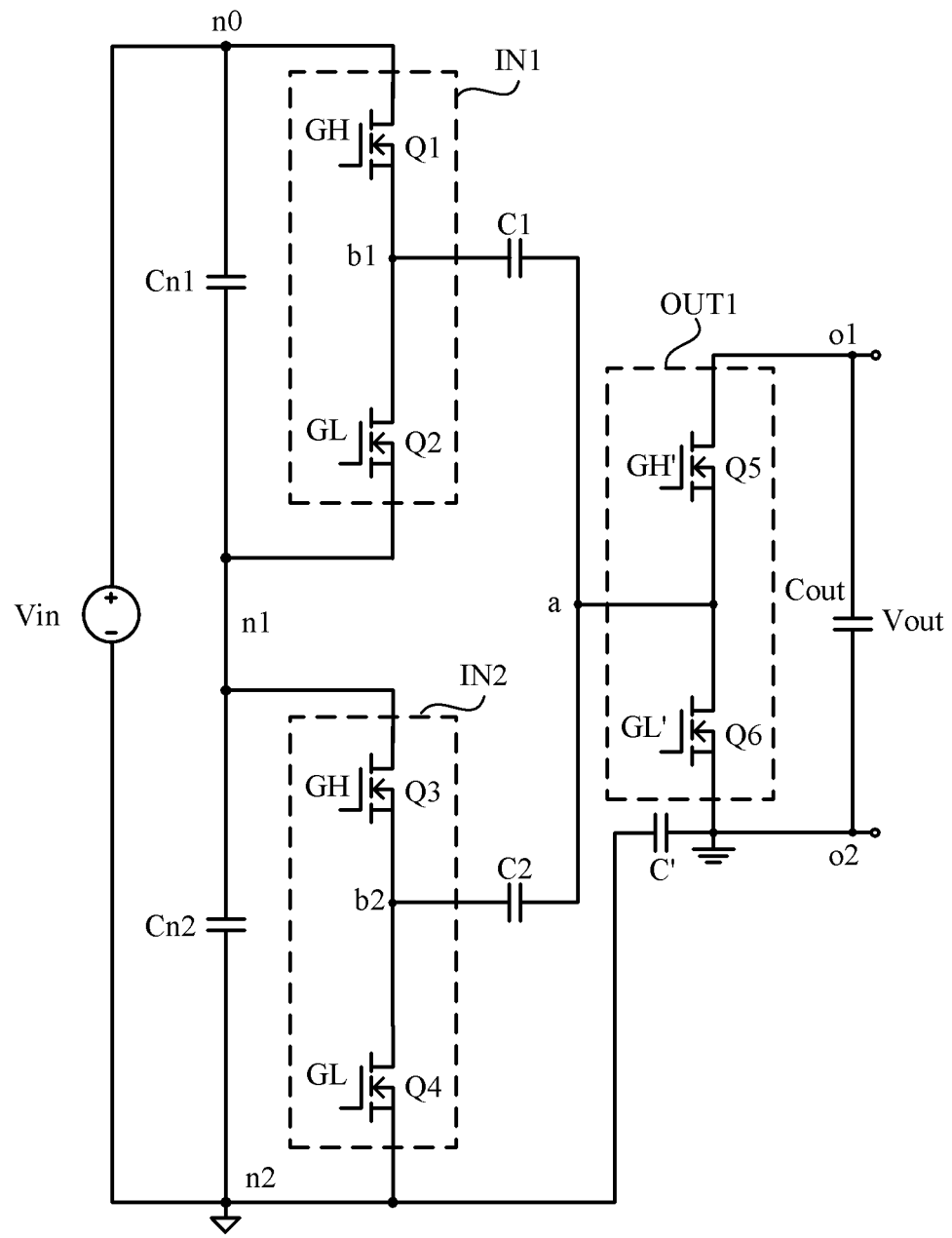
FIG. 3 is a schematic block diagram of a first example voltage regulator, in accordance with embodiments of the present invention.

Referring now to FIG. 3, shown is a schematic block diagram of a first example voltage regulator, in accordance with embodiments of the present invention. In this particular example, the voltage regulator can include input capacitors Cn1 and Cn2, energy storage capacitors C1 and C2, input switch circuits IN1 and IN2, output switch circuit OUT1 and isolation capacitor C'. One node of each of energy storage capacitors C1 and C2 can connect to a node "a", and nodes b1 and b2 of energy storage capacitors C1 and C2 can connect to input switch circuits IN1 and IN2, respectively. Input capacitors Cn1 and Cn2 can connect in series between two nodes n0 and n2 (e.g., n2 is a ground node) of an input port. Input capacitor Cn1 can connect between nodes n0 and n1, and input capacitor Cn2 can connect between node n1 and node n2. Input switch circuit IN1 can connect in parallel with input capacitor Cn1, in order to selectively couple node b1 of energy storage capacitor C1 to node n0 or n1. Input switch circuit IN2 can connect in parallel with input capacitor Cn2, in order to selectively couple node b2 of energy storage capacitor C2 to node n1 or n2. For example, the voltage may further include output capacitor Cout at an output port.

Input switch circuit IN1 can include switches Q1 and Q2 connected in series. A common node of switches Q1 and Q2 can connect to node b1 of energy storage capacitor C1, in order to form a half-bridge circuit. Input switch circuit IN2 can include switches Q3 and Q4 connected in series. A common node of switches Q3 and Q4 can connect to node b2 of energy storage capacitor C2, in order to form a half-bridge circuit. Switches Q1 and Q2 may respectively be controlled by control signals GH and GL. Switches Q3 and Q4 can respectively be controlled by control signals GH and GL.

Figure 4:
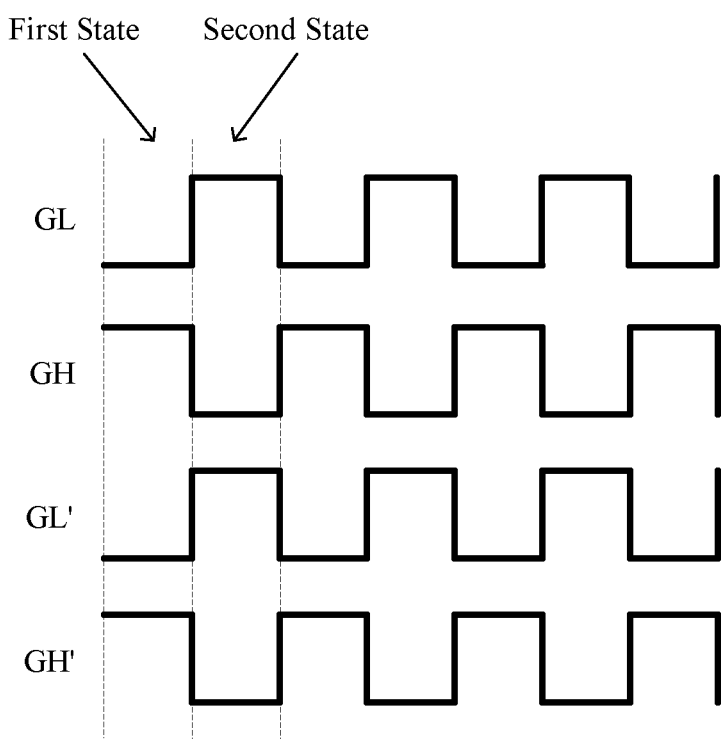
FIG. 4 is a waveform diagram of example control signal operation for the first example voltage regulator, in accordance with embodiments of the present invention.

Referring now to FIG. 4, shown is a waveform diagram of example control signal operation for the first example voltage regulator, in accordance with embodiments of the present invention. As shown in FIG. 4, control signals GH and GL can be inverted with each other, such that switches Q1 and Q2 are complementary with each other, and switches Q3 and Q4 are complementary with each other. That is, switches Q2 and Q4 may simultaneously be turned off while switches Q1 and Q3 are simultaneously turned on, and switches Q1 and Q3 may simultaneously be turned off while switches Q2 and Q4 are simultaneously turned on.

Output switch circuit OUT1 can connect with node "a" of energy storage capacitors C1 and C2, to selectively couple node "a" to node o1 or o2 (e.g., node o2 is a ground node of the output port in FIG. 3) of the output port. Output switch circuit OUT1 can include switches Q5 and Q6 connected in series. A common node of switches Q5 and Q6 can connect to node "a" of energy storage capacitors C1 and C2, in order to form a half-bridge circuit. Switches Q5 and Q6 may respectively be controlled by control signals GH' and GL'. As shown in FIG. 4, control signals GH' and GL' are inverted from each other, such that switches Q5 and Q6 are complementary with each other. Control signal GH' may be in phase with control signal GH for controlling the input switch circuit.

That is, in the circuit shown in FIG. 3, switches Q2, Q4, and Q6 may simultaneously be turned off while switches Q1, Q3, and Q5 are simultaneously turned on, and switches Q2, Q4, and Q6 may simultaneously be turned on while switches Q1, Q3, and Q5 are simultaneously turned off. Switches Q1-Q6 may alternately turned on and off under control of control signals GH, GL, GH', and GL', such that the voltage regulator is switched between a "first" state and a "second" state. Isolation capacitor C' can connect between node o2 (e.g., a ground node) of the output port and node n2 of the input port. Alternatively, isolation capacitor C' may also between node o2 of the output port and node n0, or between nodes o2 and n1. In this example, isolation capacitor C' may function to isolate the input port from the output port while forming a current return path between the input port and the output port.

Figure 5:
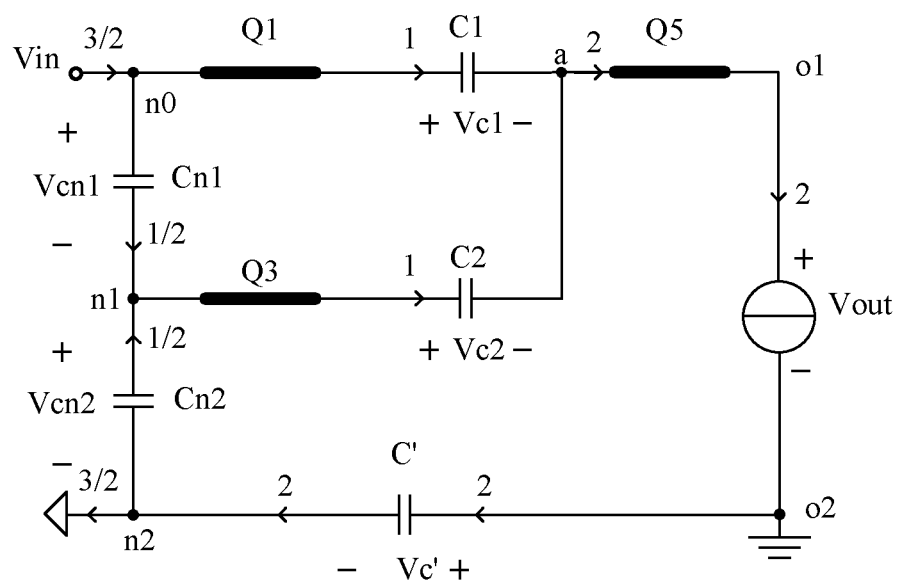
FIG. 5 is an equivalent circuit diagram of the first example voltage regulator operating in a first state, in accordance with embodiments of the present invention.

Referring now to FIG. 5, shown is an equivalent circuit diagram of the first example voltage regulator operating in a first state, in accordance with embodiments of the present invention. In this particular example, in the first state, switches Q1, Q3, and Q5 may be turned on while switches Q2, Q4, and Q6 are turned off. Node "a" can connect with energy storage capacitors C1 and C2, and to node o1 of the output port through switch Q5. Input capacitor Cn1, energy storage capacitors C1 and C2, and isolation capacitor C' can be charged by the input port and input capacitor Cn2, and output voltage Vout may be provided between nodes o1 and o2 of the output port. In this way, multiple current paths may be formed. One current path can begin from node n0, sequentially pass through switch Q1, energy storage capacitor C1, switch Q5, the output port, and isolation capacitor C', and return to node n2 of the input port.

Another current path can begin from node n0, sequentially pass through input capacitor Cn1, switch Q3, energy storage capacitor C2, switch Q5, the output port, and isolation capacitor C', and return to node n2 of the input port. Another current path can begin from node n1 connected with input capacitor Cn2, sequentially pass through switch Q3, energy storage capacitor C2, switch Q5, the output port and isolation capacitor C', and return to energy storage capacitor Cn2. For example, given that a current flowing through the output port has a magnitude of 2, a current flowing from the input port has a magnitude of $\frac{3}{2}$, a current flowing through input capacitor Cn2 has a magnitude of $\frac{1}{2}$, and a current flowing through input capacitor Cn1 has a magnitude of $\frac{1}{2}$. The current flowing through energy storage capacitor C1 and the current flowing through energy storage capacitor C2 may have the same magnitude (e.g., 1), and flow to node "a". The current flowing through isolation capacitor C' and the current flowing through the output port may have the same magnitude (e.g., 2).

Also, in the example circuit shown in FIG. 5, $Vcn1+Vcn2=Vin$; $Vc1-Vc2=Vcn1$; and $Vcn2-Vc2-Vc'=Vout$. Vcn1 may denote a voltage across input capacitor Cn1, Vcn2 may denote a voltage across input capacitor Cn2, Vin may denote a voltage across the input port, Vc1 may denote a voltage across energy storage capacitor C1, Vc2 may denote a voltage across energy storage capacitor C2, Vc' denotes a voltage across isolation capacitor C', and Vout may denote a voltage across the output port.

Figure 6:
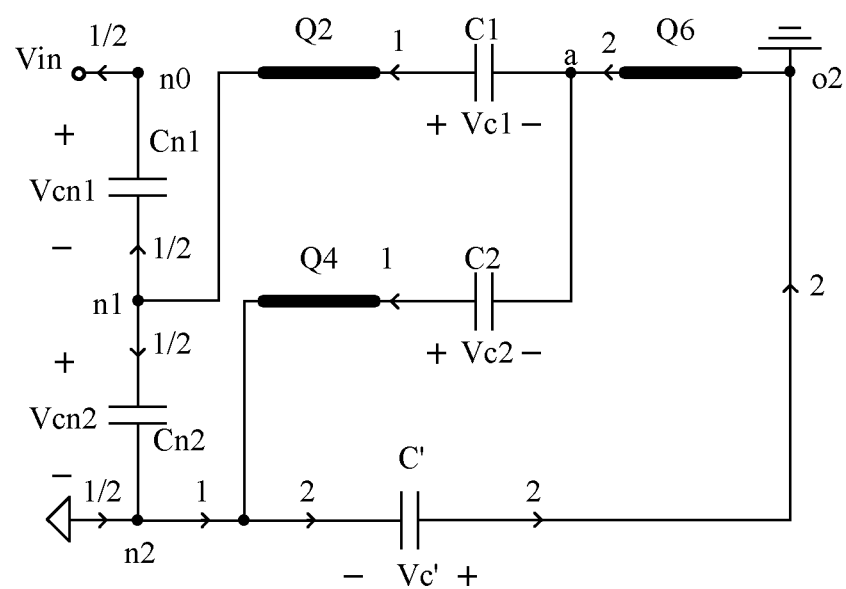
FIG. 6 is an equivalent circuit diagram of the first example voltage regulator operating in a second state, in accordance with embodiments of the present invention.

Referring now to FIG. 6, shown is an equivalent circuit diagram of the first example voltage regulator operating in a second state, in accordance with embodiments of the present invention. In this particular example, in the second state, switches Q2, Q4, and Q6 can be turned on, while switches Q1, Q3, and Q5 may be turned off. As shown, input capacitor Cn1, energy storage capacitors C1 and C2 and isolation capacitor C' may discharge, in order to charge input capacitor Cn2, and provide a current to the input port. In this way, multiple current paths may be formed. A current path can begin from energy storage capacitor C1, sequentially pass through switch Q2, input capacitor Cn1, nodes n0 and n2 of the input port, isolation capacitor C', nodes o1 and o2 of the output port, and switch Q6, and return to node "a" of energy storage capacitor C1. Another current path can begin from energy storage capacitor C1, sequentially pass through switch Q2, input capacitor Cn2, isolation capacitor C', nodes o1 and o2 of the output port, and switch Q6, and return to node "a" of energy storage capacitor C1.

Another current path can begin from energy storage capacitor C2, sequentially pass through switch Q4, isolation capacitor C', nodes o1 and o2 of the output port, and switch Q6, and return to node "a" of energy storage capacitor C2. For example, a direction of the current flowing through each of the capacitors in the second state is opposite to a direction of the current flowing through the capacitor in the first state. In the second state, node o1 of the output port may float. Correspondingly, e.g., given that a current flowing through energy storage capacitor C1 has a magnitude of 1, a current flowing from the input port (from the group node) has a magnitude of ½, a current flowing through input capacitor Cn2 has a magnitude of ½, a current flowing through input capacitor Cn1 has a magnitude of ½, a current flowing through energy storage capacitor C2 has a magnitude of 1, and a current flowing through isolation capacitor C' has a magnitude of 2. In a case that the voltage regulator is in the first state for the same duration as in the second state, an average current flowing through the output port has a magnitude of, e.g., 1.

In the example circuit shown in FIG. 6, Vcn1+Vcn2=Vin; Vc1−Vc2=Vcn2; and Vc2+Vc'=0. When the voltage regulator switches between the first and second states at a relatively high frequency, a voltage of the capacitor may not change rapidly among different states. Therefore, parameters in the first state may be substantially the same as parameters in the second state. Therefore, according to the above equations, Vcn1=Vcn2=Vin/2, and further, Vout=Vcn2=Vin/2.

That is, output voltage Vout of the voltage regulator in this particular example is ½ of input voltage Vin, which corresponds to the number of the provided input capacitors. Here, the two input capacitors and the two input switch circuits respectively correspond to the two input capacitors form two input circuits, and the output switch circuit may form an output circuit. The two input circuits can connect to the output circuit through the two energy storage capacitors, respectively. The input switch circuits and the output switch circuit can be controlled to be switched among states, to control the energy storage capacitors and the input capacitors to charge and discharge, in order to realize power conversion. A step down ratio of the voltage regulator can be set by changing the number of input circuits and the number of energy storage capacitors, thereby obtaining a relatively high step down ratio with a relatively small circuit volume. Also, an isolation capacitor may be provided in this example, in order to isolate the input port from the output port without a transformer, thereby avoiding an influence of current ripple of the input voltage and the output capacitance.

Figure 7:
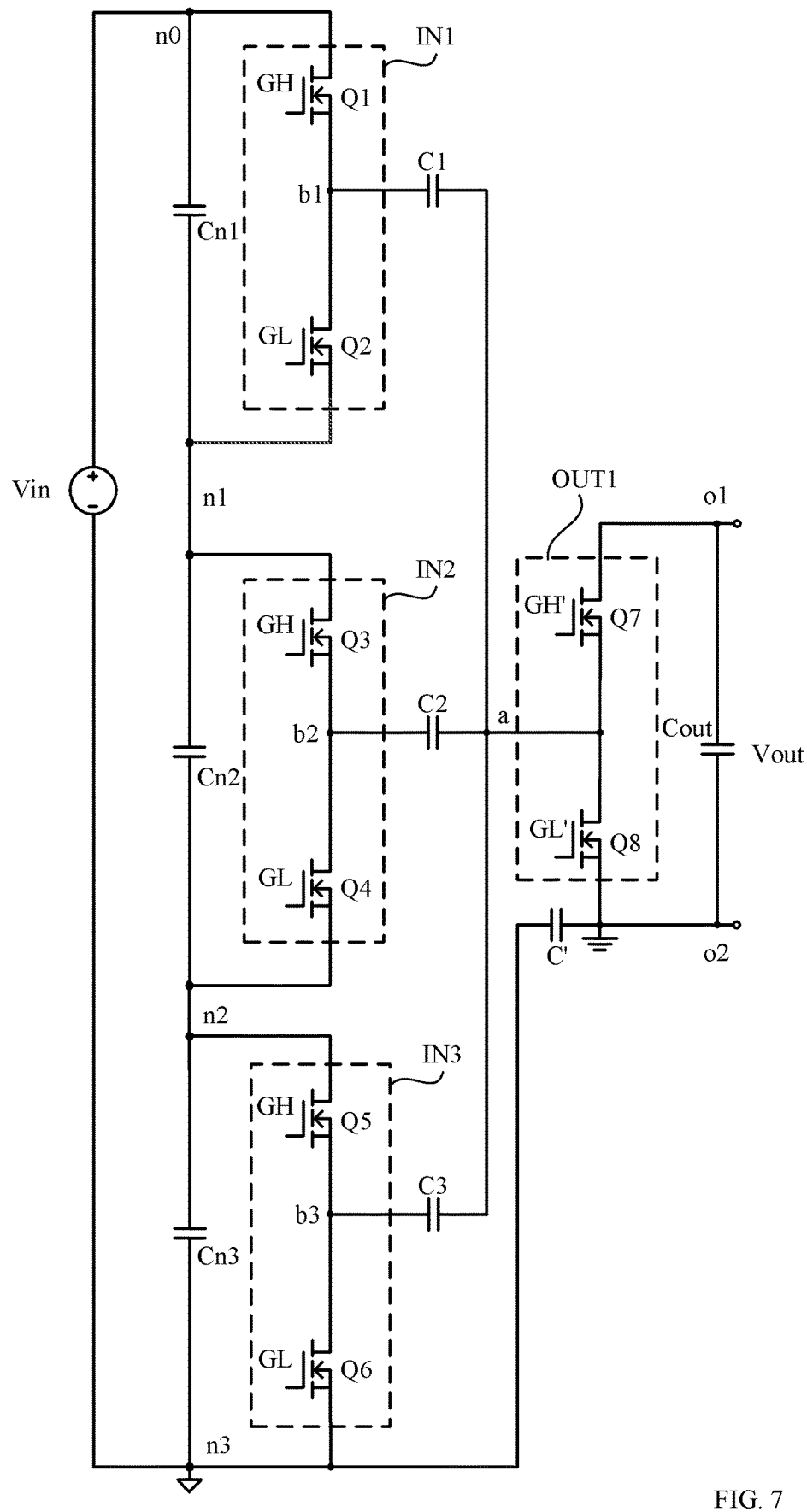
FIG. 7 is a schematic block diagram of a second example voltage regulator, in accordance with embodiments of the present invention.

Referring now to FIG. 7, shown is a schematic block diagram of a second example voltage regulator, in accordance with embodiments of the present invention. In this particular example, the voltage regulator can include input capacitors Cn1 to Cn3, energy storage capacitors C1-C3, input switch circuits IN1-IN3, output switch circuit OUT1, and isolation capacitor C'. Input capacitors Cn1-Cn3 can sequentially be connected in series between two nodes n0 and n3 of the input port. One node of each of energy storage capacitors C1-C3 can connect to a node "a", and the other nodes of energy storage capacitors C1-C3 may connect to input switch circuits IN1-IN3, respectively. Input switch circuit INi can connect in parallel with input capacitor Cni, in order to selectively couple node "bi" of energy storage capacitor Ci corresponding to input switch circuit INi to one of two nodes of input capacitor Cni, where i=1, 2, or 3. Output switch circuit OUT1 can connect across the output port, in order to selectively couple the node "a" to node o1 or o2 of the output port. Isolation capacitor C' can connect between node o2 of the output port and a node connected to any one of the input capacitors (that is, any one of nodes n0 to n3).

In FIG. 7, isolation capacitor C' can connect between node o2 of the output port and ground node n3 of the input port. For example, the voltage regulator may further include output capacitor Cout connected across the output port. Input switch circuit IN1 can include switches Q1 and Q2 connected in series. Input switch circuit IN2 can include switches Q3 and Q4 connected in series. Input switch circuit IN3 can include switches Q5 and Q6 connected in series. Therefore, three half-bridge circuits may be formed, which correspond to input capacitors Cn1-Cn3, respectively. A common node of the switches in input switch circuit INi can connect to node "bi" of energy storage capacitor Ci corresponding to input switch circuit INi.

Figure 8:
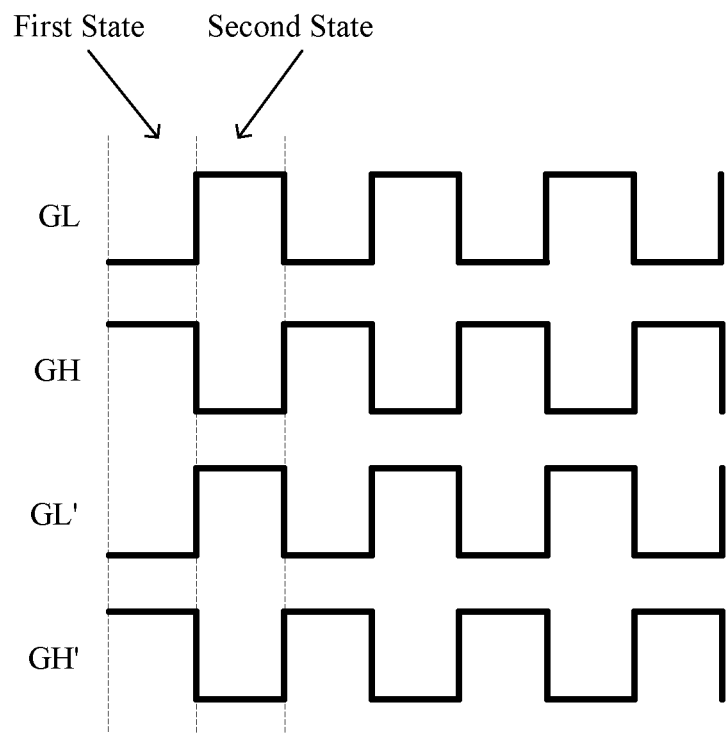
FIG. 8 is a waveform diagram of example control signal operation for the second example voltage regulator, in accordance with embodiments of the present invention.

Referring also to FIG. 8, shown is a waveform diagram of example control signal operation for the second example voltage regulator, in accordance with embodiments of the present invention. The two switches of input switch circuit INi can be turned on or turned off under the respective control of control signals GH and GL inverted from each other. The two switches are thus complementary with each other. In input switch circuit INi, one of the switches may be turned on while the other of the switches is turned off, in order to selectively couple node "bi" of input switch circuit INi to one of two nodes of input capacitor Cni corresponding to input switch circuit INi.

Output switch circuit OUT1 can include switches Q7 and Q8 connected in series. Switches Q7 and Q8 can connect in series across the output port, in order to form a half-bridge circuit. Switches Q7 and Q8 can be controlled by control signals GH' and GL', respectively. As shown, control signals GH' and GL' may be inverted from each other, such that switches Q7 and Q8 are complementary with each other. Control signal GH' may be in phase with control signal GH for controlling the input switch circuit. That is, in the circuit shown in FIG. 7, switches Q1, Q3, Q5, and Q7 can simultaneously be turned on while switches Q2, Q4, Q6, and Q8 are simultaneously turned off, and switches Q1, Q3, Q5, and Q7 may simultaneously be turned off while switches Q2, Q4, Q6, and Q8 are simultaneously turned on. Switches Q1-Q8 may alternately be turned on and off under control of control signals GH, GL, GH', and GL', such that the voltage regulator is switched between a first state and a second state.

Figure 9:
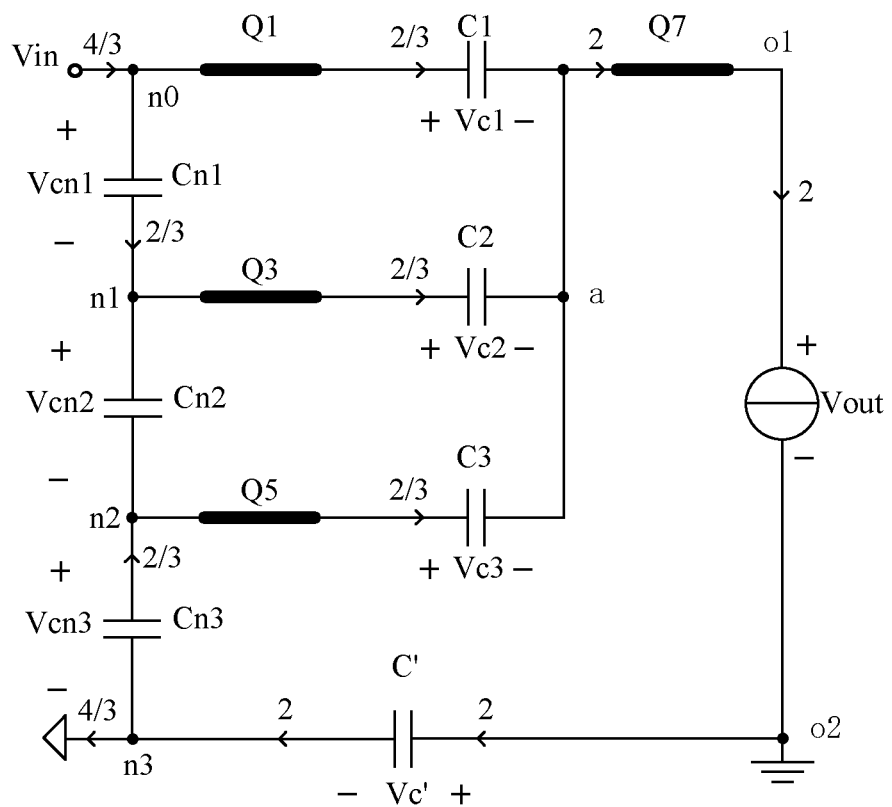
FIG. 9 is an equivalent circuit diagram of the second example voltage regulator operating in a first state, in accordance with embodiments of the present invention.

Referring now to FIG. 9, shown is an equivalent circuit diagram of the second example voltage regulator operating in a first state, in accordance with embodiments of the present invention. In this particular example, in the first state, switches Q1, Q3, Q5, and Q7 may be turned on, while switches Q2, Q4, Q6, and Q8 are turned off. As shown, node "a" can connect to node o1 of the output port through switch Q7. Input capacitor Cn1, energy storage capacitors C1-C3, and isolation capacitor C' can be charged by the input port and input capacitor Cn3, such that a current flows through nodes o1 and o2 of the output port, and output voltage Vout may be provided between nodes o1 and o2 of the output port. In this way, multiple current paths may be formed.

A current path can begin from node n0 of the input port, sequentially pass through switch Q1, energy storage capacitor C1, switch Q7, nodes o1 and o2 of the output port and isolation capacitor C', and return to node n3 of the input port. Another circuit path can begin from node n0 of the input port, sequentially pass through input capacitor Cn1, switch Q3, energy storage capacitor C2, switch Q7, nodes o1 and o2 of the output port, and isolation capacitor C', and return to node n3 of the input port. Another current path can begin from node n2 connected to input capacitor Cn3, sequentially pass through switch Q5, energy storage capacitor C3, switch Q7, nodes o1 and o2 of the output port and isolation capacitor C', and return to node n3 connected to input capacitor Cn3.

If, for example, a current flowing through the output port has a magnitude of 2, a current flowing from the input port has a magnitude of 4/3, a current flowing through input capacitor Cn3 has a magnitude of 2/3, a current flowing through input capacitor Cn1 has a magnitude of 2/3, and a current flowing through input capacitor Cn2 has a magnitude of 0, currents flowing through energy storage capacitors C1-C3 have the same magnitude, which is 2/3, and a current flowing through the isolation capacitor and a current flowing through the output port have the same magnitude (e.g., 2). In this example circuit, Vcn1+Vcn2+Vcn3=Vin; Vc1−Vc2=Vcn1; Vc2−Vc3=Vcn2; and Vcn3−Vc3−Vc'=Vout. Vcni may denote a voltage across input capacitor Cni, where i=1, 2 or 3. Vci may denote a voltage across energy storage capacitor Ci, where i=1, 2 or 3. Vc' may denote a voltage across isolation capacitor C'. Vin may denote a voltage across the input port, and Vout may denote a voltage across the output port.

Figure 10:
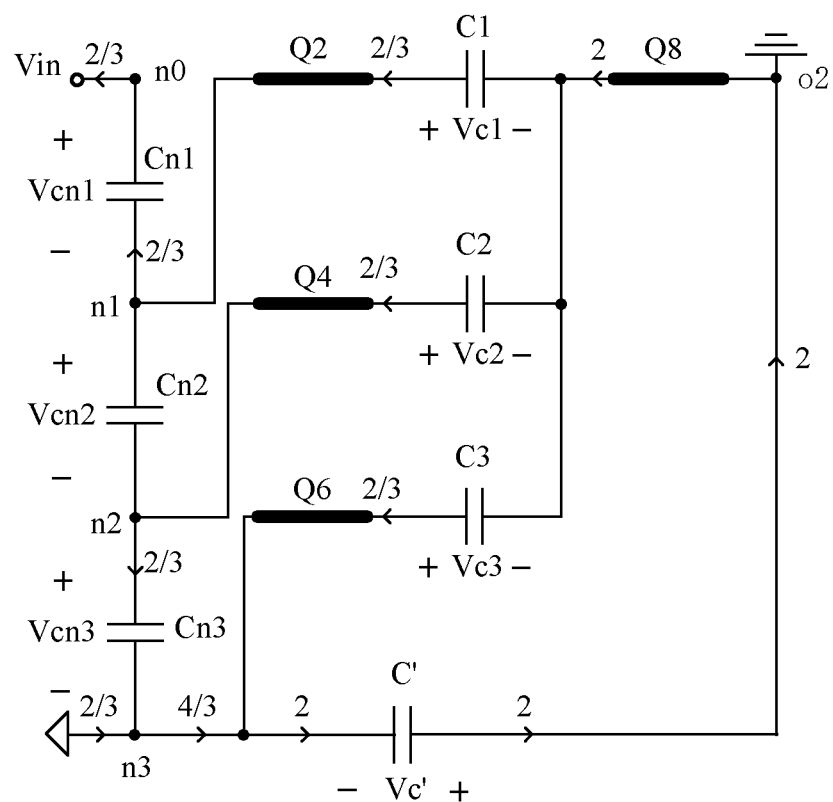
FIG. 10 is an equivalent circuit diagram of the second example voltage regulator operating in a second state, in accordance with embodiments of the present invention.

Referring now to FIG. 10, shown is an equivalent circuit diagram of the second example voltage regulator operating in a second state, in accordance with embodiments of the present invention. In this particular example, in the second state, switches Q2, Q4, Q6, and Q8 are turned on while switches Q1, Q3, Q5, and Q7 are turned off. As shown, input capacitor Cn3 can be charged by input capacitor Cn1, energy storage capacitors C1-C3, and isolation capacitor C', and a current may be provided to the output port. Therefore, multiple current paths can be formed. A current path can begin from energy storage capacitor C1, sequentially pass through switch Q2, input capacitor Cn1, nodes n0 and n3 of the input port, isolation capacitor C' and switch Q8, and return to energy storage capacitor C1. Another current path can begin from energy storage capacitor C2, sequentially pass through switch Q4, input capacitor Cn3, isolation capacitor C', and switch Q8, and return to energy storage capacitor C2.

Another current path can begin from energy storage capacitor C3, sequentially pass through switch Q6, isolation capacitor C' and switch Q8, and return to energy storage capacitor C3. In the second state, node o1 of the output port may float. For example, a direction of the current flowing through each of the capacitors in the second state is opposite to a direction of the current flowing through the capacitor in the first state. Correspondingly, for example, a current flowing from the output port may have a magnitude of 2, a current flowing through input capacitor Cn1 has a magnitude of 2/3, a current flowing through input capacitor Cn2 has a magnitude of 0, a current flowing through input capacitor Cn3 has a magnitude of 2/3, a current flowing through each of energy storage capacitors C1 to C3 has a magnitude of 2/3, and a current flowing through isolation capacitor C' has a magnitude of 2. When the voltage regulator is in the first state for the same duration as the second state, an average current flowing through the output port has a magnitude of, e.g., 1.

In the circuit shown in FIG. 10, Vcn1+Vcn2+Vcn3=Vin; Vc1−Vc2=Vcn2; Vc2−Vc3=Vcn3; and Vc3+Vc'=0. When the voltage regulator is switched between the first state and the second state at a relatively high frequency, a voltage of the capacitor may not change rapidly among different states. Therefore, parameters in the first state may be substantially the same as parameters in the second state. As such, according to the above equations, Vcn1=Vcn2=Vcn3=Vin/3, and further, Vout=Vcn3=Vin/3. That is, the output voltage of the voltage regulator in this particular example is 1/3 of input voltage Vin, which corresponds to the number of provided input capacitors. Similarly, when N energy storage capacitors, N input capacitors and N input switch circuits are provided in a voltage regulator having a similar structure, output voltage Vout is 1/N of input voltage Vin, where N is a positive integer. In this way, a voltage regulator with any step down ratio can be implemented.

Figure 11:
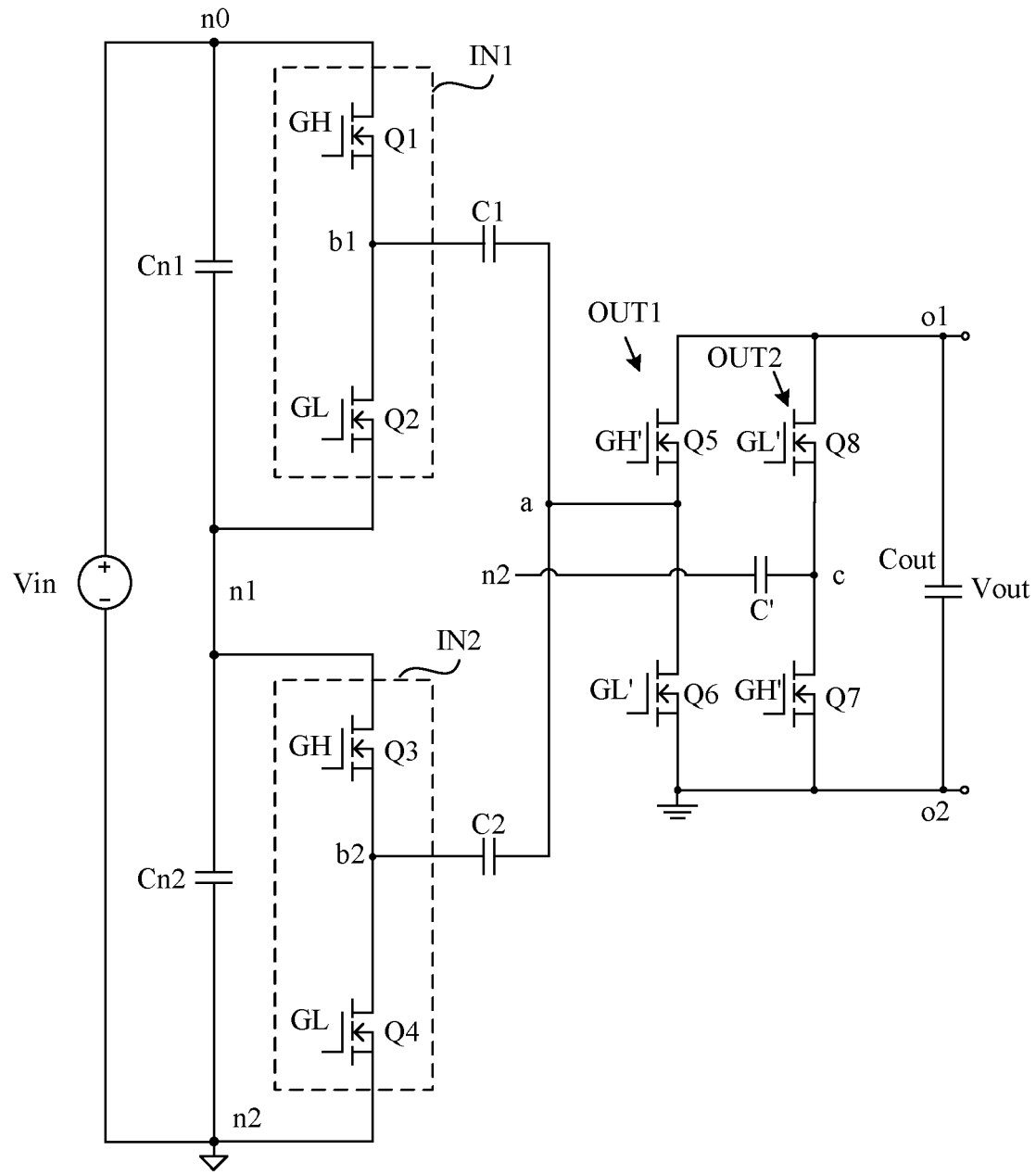
FIG. 11 is a schematic block diagram of a third example voltage regulator, in accordance with embodiments of the present invention.

Referring now to FIG. 11, shown is a schematic block diagram of a third example voltage regulator, in accordance with embodiments of the present invention. In this particular example, the voltage regulator can include two input capacitors Cn1 and Cn2, two energy storage capacitors C1 and C2, and input switch circuits IN1 and IN2 each in a form of a half-bridge circuit. Input switch circuits IN1 and IN2 can effectively change a connection relation between the energy storage capacitor and the input capacitor. On an output side, the voltage regulator can include an output circuit in a form of a full-bridge circuit. For example, the voltage regulator may further include output capacitor Cout connected across the output port. The output circuit can include output switch circuits OUT1 and OUT2. Output switch circuit OUT1 can selectively couple a node "a" connected with energy storage capacitors C1 and C2 to node o1 or o2 of the output port. Output switch circuit OUT2 can connect in parallel with output switch circuit OUT1. Output switch circuit OUT2 may selectively couple input node "c" of output switch circuit OUT2 to node o1 or o2 of the output port. Output switch circuit OUT1 can include switches Q5 and Q6 connected in series. A common node of switches Q5 and Q6 can connect to node "a", in order to form a half-bridge circuit. Switches Q5 and Q6 may respectively be controlled by control signals GH' and GL'.

Figure 12:
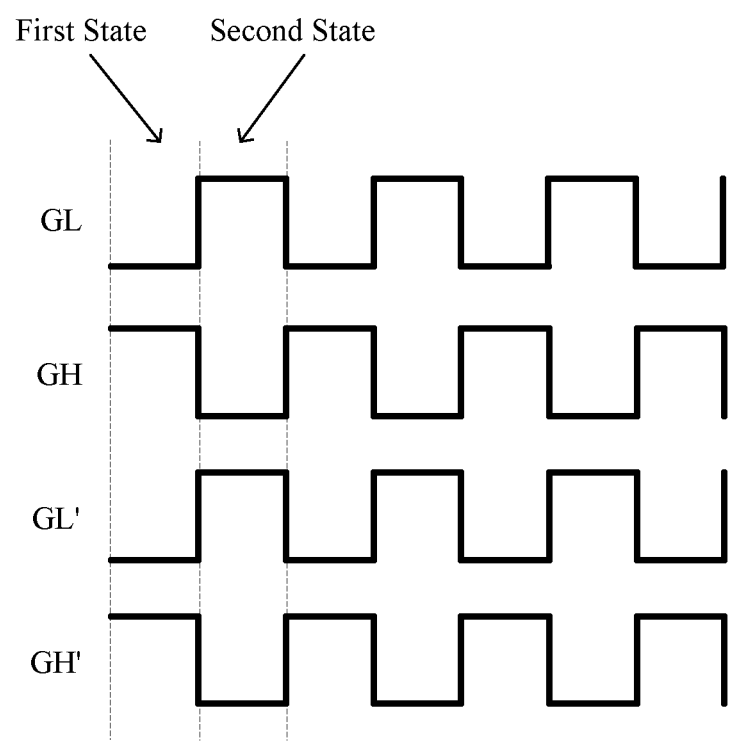
FIG. 12 is a waveform diagram of example control signal operation for the third example voltage regulator, in accordance with embodiments of the present invention.

Referring now to FIG. 12, shown is a waveform diagram of example control signal operation for the third example voltage regulator, in accordance with embodiments of the present invention. As shown, control signals GH' and GL' are inverted with respect to each other, such that switches Q5 and Q6 are complementary with each other. Control signal GH' can be in phase with control signal GH for controlling the input switch circuit. Output switch circuit OUT2 can include switches Q7 and Q8 connected in series. A common node of switches Q7 and Q8 is input node "c" of output switch circuit OUT2. Switches Q7 and Q8 may be turned on or turned off under the respective control of control signals GH' and GL'. Therefore, in the circuit shown in FIG. 11, switches Q1, Q3, Q5, and Q7 may simultaneously be turned on while switches Q2, Q4, Q6, and Q8 may simultaneously be turned off, and switches Q1, Q3, Q5, and Q7 may simultaneously be turned off while switches Q2, Q4, Q6, and Q8 are simultaneously turned on. Switches Q1-Q8 may alternately be turned on and off under control of control signals GH, GL, GH' and GL', such that the voltage regulator switches between the first and second states. Also, a node of isolation capacitor C' can connect to input node "c" of output switch circuit OUT2, and the other node of isolation capacitor C' can connect to a node connected to any one of the input capacitors. In FIG. 11, isolation capacitor C' can connect between nodes "c" and n2. Therefore, isolation capacitor C' can effectively isolate the input port from the output port while forming a current path from the output port to the input port.

Figure 13:
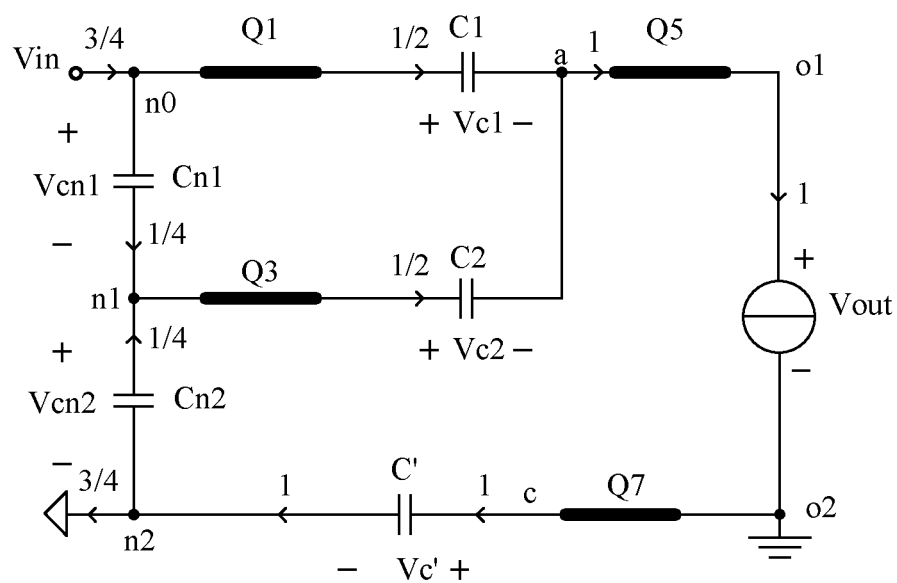
FIG. 13 is an equivalent circuit diagram of the third example voltage regulator operating in a first state, in accordance with embodiments of the present invention.

Referring now to FIG. 13, shown is an equivalent circuit diagram of the third example voltage regulator operating in a first state, in accordance with embodiments of the present invention. In this particular example, in the first state, switches Q1, Q3, Q5, and Q7 are turned on while switches Q2, Q4, Q6, and Q8 are turned off. Here, node "a" can connect to node o1 of the output port through switch Q5, and node "c" can connect to node o2 of the output port through switch Q7. The input port and input capacitor Cn2 may discharge, in order to charge energy storage capacitors C1 and C2, isolation capacitor C', and the output port. In this way, multiple current paths may be formed.

One current path may begin from the node n0 of the input port, sequentially pass through switch Q1, energy storage capacitor C1, switch Q5, nodes o1 and o2 of the output port, switch Q7, and isolation capacitor C', and return to node n2 of the input port. Another current path can begin from node n0 of the input port, sequentially pass through input capacitor Cn1, switch Q3, energy storage capacitor C2, switch Q5, nodes o1 and o2 of the output port, switch Q7 and isolation capacitor C', and return to node n2 of the input port. Another current path taking input capacitor Cn2 as a current source may sequentially pass through node n1, switch Q3, energy storage capacitor C2, switch Q5, nodes o1 and o2 of the output port, switch Q7, isolation capacitor C', and node n2. If, for example, a current flowing through the output port has a magnitude of 1, a current flowing from the input port has a magnitude of ¾, a current flowing through input capacitor Cn2 has a magnitude of ¼, and a current flowing through input capacitor Cn1 is ¼.

For example, current flowing through energy storage capacitor C1 and a current flowing through energy storage capacitor C2 may have the same magnitude (e.g., ½), and flow to node "a". For example, current flowing through isolation capacitor C' and a current flowing through the output port have the same magnitude (e.g., 1). In the circuit shown in FIG. 13, $Vcn1+Vcn2=Vin$; $Vc1-Vc2=Vcn1$; and $Vcn2-Vc2-Vc'=Vout$. Vcn1 may denote a voltage across input capacitor Cn1. Vcn2 may denote a voltage across input capacitor Cn2. Vin may denote a voltage across the input port. Vc1 may denote a voltage across energy storage capacitor C1, and Vc2 may denote a voltage across energy storage capacitor C2. Vc' may denote a voltage across isolation capacitor C'. Also, Vout may denote a voltage across the output port.

Figure 14:
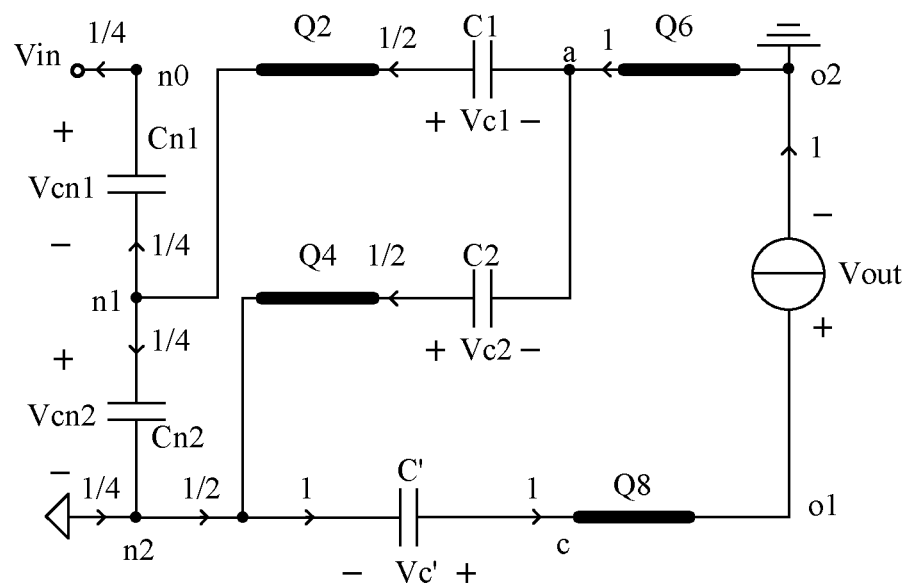
FIG. 14 is an equivalent circuit diagram of the third example voltage regulator operating in a second state, in accordance with embodiments of the present invention.

Referring now to FIG. 14, shown is an equivalent circuit diagram of the third example voltage regulator operating in a second state, in accordance with embodiments of the present invention. In this particular example, in the second state, switches Q2, Q4, Q6, and Q8 may be turned on while switches Q1, Q3, Q5, and Q7 are turned off. As shown, node "a" can connect to node o2 of the output port through switch Q6, and node "c" can connect to node o1 of the output port through switch Q8. Input capacitor Cn1, energy storage capacitors C1 and C2 and isolation capacitor C' may discharge, in order to charge the input capacitor Cn2, the output port and the input port. Therefore, multiple current paths may be formed, which are different from the multiple current paths in the first state.

A current path may begin from energy storage capacitor C1, sequentially pass through switch Q2, input capacitor Cn1, nodes n0 and n2 of the input port, isolation capacitor C', switch Q8, nodes o1 and o2 of the output port, and switch Q6, and return to node "a". Another current path may begin from the energy storage capacitor C1, sequentially pass through switch Q2, input capacitor Cn2, isolation capacitor C', switch Q8, nodes o1 and o2 of the output port, and switch Q6, and return to node "a". Another current path may begin from energy storage capacitor C2, sequentially pass through switch Q4, isolation capacitor C', switch Q8, nodes o1 and o2 of the output port, and switch Q6, and return to node "a". For example, a direction of the current flowing through each of the capacitors in the second state is opposite to a direction of the current flowing through the capacitor in the first state. If, for example a current flowing through the output port has a magnitude of 1, a current flowing through energy storage capacitor C1 and a current flowing through energy storage capacitor C2 have the same magnitude, which is ½, a current flowing through input capacitor Cn1 has a magnitude of ¼, a current flowing through input capacitor Cn2 has a magnitude of ¼, and a current flowing through isolation capacitor C' and a current flowing through the output port have the same magnitude (e.g., 1).

Also, in the example current shown in FIG. 14, $Vcn1+Vcn2=Vin$; $Vc1-Vc2=Vcn2$; and $Vc2+Vc'=Vout$. If the voltage regulator is switched between the first state and the second state at a relatively high frequency, a voltage of the capacitor may not change rapidly among the different states. Therefore, parameters in the first state can be substantially the same as parameters in the second state. Therefore, according to the above equations, $Vcn1=Vcn2=Vin/2$; and $Vout=Vcn2/2=Vin/4$. That is, output voltage Vout of the voltage regulator in this example is ¼ of input voltage Vin, which corresponds to the double of the number of the provided input capacitors.

A second output switch circuit may additionally be provided in particular embodiments. The second output switch circuit and the first output switch circuit may form a full-bridge circuit, in order to change a connection relation of the circuit. Therefore, the output port can be connected in the current path whether in the first state or the second state, and the energy storage capacitors or the input port can constantly supply power to the output port, thereby improving reliability of the voltage of the output port. Also, the voltage regulator may have a higher step down ratio with the same number of capacitors, as compared to other approaches. Further, an isolation capacitor may be provided in order to isolate the input port from the output port without a transformer, thereby avoiding an influence of current ripple of the input voltage and the output capacitance.

Figure 15:
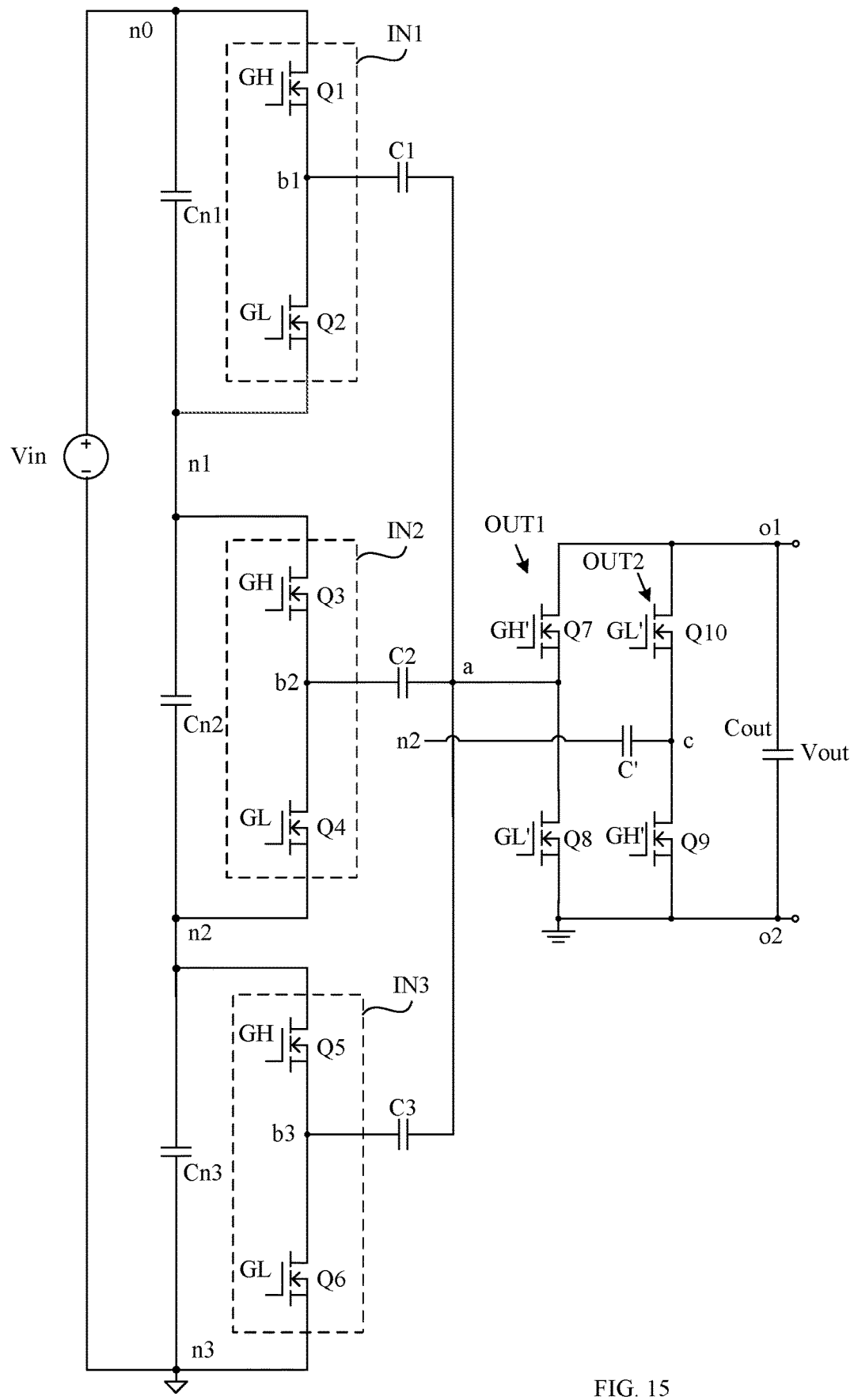
FIG. 15 is a schematic block diagram of a fourth example voltage regulator, in accordance with embodiments of the present invention.

Referring now to FIG. 15, shown is a schematic block diagram of a fourth example voltage regulator, in accordance with embodiments of the present invention. In this particular example, the voltage regulator can include three input capacitors Cn1-Cn3, three energy storage capacitors C1-C3, and three input switch circuits IN1-IN3. In input switch circuits IN1-IN3, switches Q1, Q3, and Q5 may be controlled by control signal GH, and switches Q2, Q4, and Q6 can be controlled by control signal GL. On an output side, output switch circuit OUT1, output switch circuit OUT2, and isolation capacitor C' are provided. For example, the voltage regulator may further include output capacitor Cout connected across the output port. Output switch circuit OUT1 can include switches Q7 and Q8, and output switch circuit OUT2 can include switches Q9 and Q10. Switches Q7 and Q8 may respectively be controlled by control signals GH' and GL'.

Figure 16:
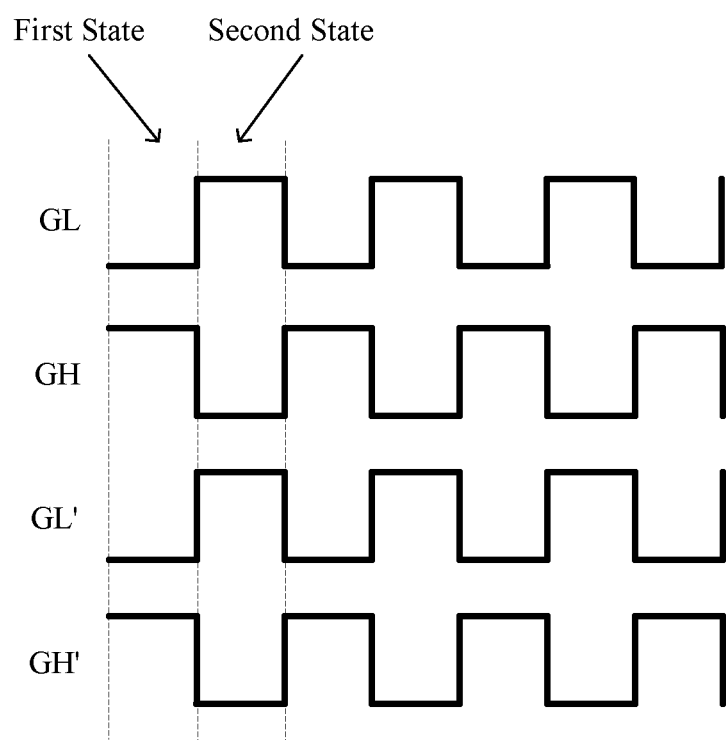
FIG. 16 is a waveform diagram of example control signal operation for the fourth example voltage regulator, in accordance with embodiments of the present invention.

Referring now to FIG. 16, shown is a waveform diagram of example control signal operation for the fourth example voltage regulator, in accordance with embodiments of the present invention. As shown, control signals GH' and GL' are inverted from each other, such that switches Q7 and Q8 are complementary with each other, and switches Q9 and Q10 are complementary with each other. Also, control signal GH' may be in phase with control signal GH for controlling the input switch circuit. In this example, switches Q1, Q3, Q5, Q7, and Q9 may simultaneously be turned on while switches Q2, Q4, Q6, Q8, and Q10 are simultaneously turned off, and switches Q1, Q3, Q5, Q7, and Q9 may simultaneously be turned off while switches Q2, Q4, Q6, Q8, and Q10 are simultaneously turned on. Therefore, switches Q1-Q10 can alternately be turned on and off under control of control signals GH, GL, GH', and GL', such that the voltage regulator is switched between the first and second states. A node of isolation capacitor C' can connect to input node "c" of output switch circuit OUT2, and the other node of the isolation capacitor C' can connect to a node connected to any one of the input capacitors. In FIG. 15, isolation capacitor C' can connect between nodes "c" and n3. Therefore, isolation capacitor C' can effectively isolate the input port from the output port while forming a current path from the output port to the input port.

Figure 17:
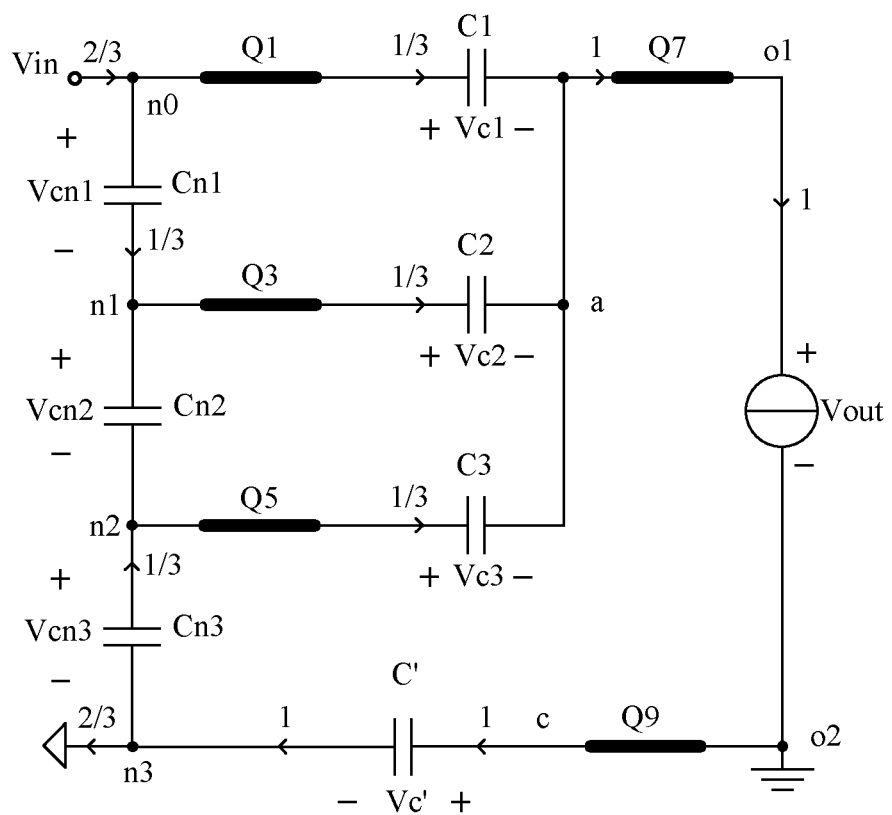
FIG. 17 is an equivalent circuit diagram of the fourth example voltage regulator operating in a first state, in accordance with embodiments of the present invention.

Referring now to FIG. 17, shown is an equivalent circuit diagram of the fourth example voltage regulator operating in a first state, in accordance with embodiments of the present invention. In this particular example, in the first state, switches Q1, Q3, Q5, Q7, and Q9 can be turned on, while switches Q2, Q4, Q6, Q8, and Q10 may be turned off. As shown, node "a" can connect to node o1 of the output port through switch Q7, and node "c" can connect to node o2 of the output port through switch Q9. The input port and input capacitor Cn3 may discharge, in order to charge input capacitor Cn1, energy storage capacitors C1 to C3, and isolation capacitor C', such that a current flows through nodes o1 and o2 of the output port, in order to generate an output voltage Vout across the output port. Therefore, multiple current paths may be formed in this fashion.

A current path may begin from the input port, sequentially pass through switch Q1, energy storage capacitor C1, switch Q7, nodes o1 and o2 of the output port, switch Q9 and isolation capacitor C', and return to node n3 (e.g., the ground node of the input port). Another current path may begin from the input port, sequentially pass through input capacitor Cn1, switch Q3, energy storage capacitor C2, switch Q7, nodes o1 and o2 of the output port, switch Q9 and isolation capacitor C', and return to node n3. Another current path may begin from node n2 connected to input capacitor Cn3, sequentially pass through switch Q5, energy storage capacitor C3, switch Q7, nodes o1 and o2 of the output port, switch Q9, and isolation capacitor C', and return to node n3. If, for example, a current flowing through the output port has a magnitude of 1, a current flowing from the input port has a magnitude of ⅔, a current flowing through the input capacitor Cn1 and a current flowing through input capacitor Cn3 have the same magnitude, which is ⅓, a current flowing through input capacitor Cn2 has a magnitude of 0, currents flowing through energy storage capacitors C1-C3 have the same magnitude, which is ⅓, and a current flowing through isolation capacitor C' and a current flowing through the output port have the same magnitude (e.g., 1). In the example circuit shown in FIG. 17, Vcn1+Vcn2+Vcn3=Vin; Vc1−Vc2=Vcn1; Vc2−Vc3=Vcn2; and Vcn3−Vc3−Vc'=Vout.

Figure 18:
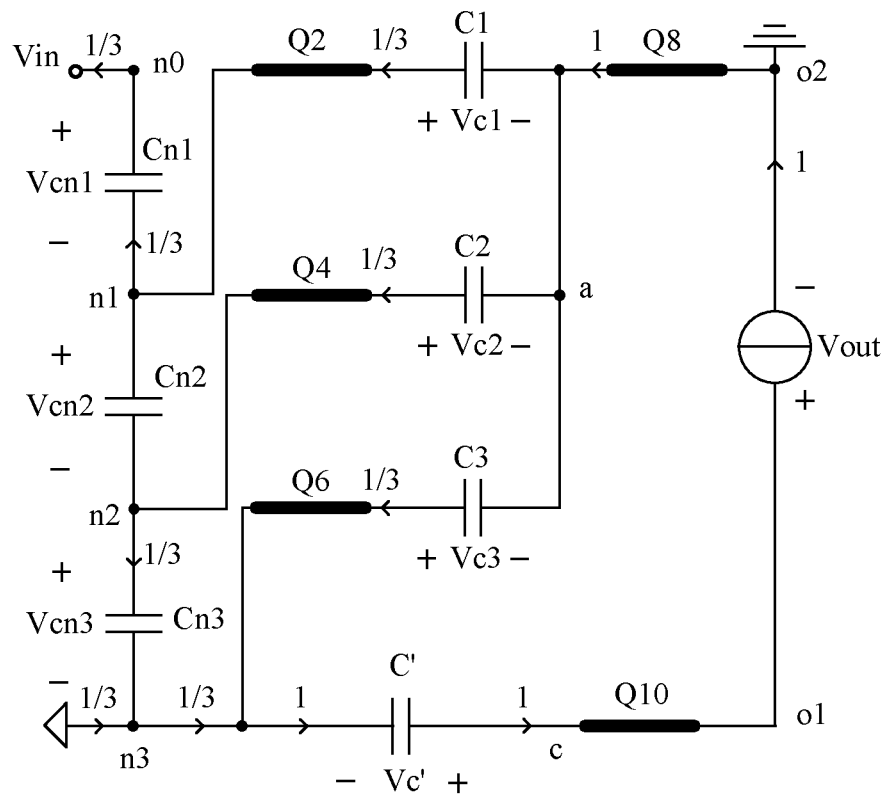
FIG. 18 is an equivalent circuit diagram of the fourth example voltage regulator operating in a second state, in accordance with embodiments of the present invention.

Referring now to FIG. 18, shown is an equivalent circuit diagram of the fourth example voltage regulator operating in a second state, in accordance with embodiments of the present invention. In this particular example, in the second state, switches Q2, Q4, Q6, Q8, and Q10 may be turned on while switches Q1, Q3, Q5, Q7, and Q9 can be turned off. As shown, node "a" can connect to node o2 of the output port through switch Q8, and node "c" can connect to node o1 of the output port through switch 10. Input capacitor Cn1, energy storage capacitors C1 to C3 and isolation capacitor C' may discharge, in order to charge the input port, the output port and input capacitor Cn3. In this way, multiple circuit paths may be formed. For example, a direction of the current flowing through each of the capacitors in the second state is opposite to a direction of the current flowing through the capacitor in the first state. Also, since a connection relation may accordingly be changed, a direction of a current flowing through the output port can remain unchanged while a current flowing through each of the capacitors is inverted.

A current path may begin from energy storage capacitor C1, sequentially pass through switch Q2, input capacitor Cn1, nodes n0 and n3 of the input port, isolation capacitor C', switch Q10, nodes o1 and o2 of the output port, and switch Q8, and return to capacitor C1. Another current path may begin from energy storage capacitor C2, sequentially pass through switch Q4, energy storage capacitor Cn3, isolation capacitor C', switch Q10, nodes o1 and o2 of the output port, and switch Q8, and return to energy storage capacitor C2. Another current path may begin from energy storage capacitor C3, sequentially pass through switch Q6, isolation capacitor C', switch Q10, nodes o1 and o2 of the output port, and switch Q8, and return to energy storage capacitor C3. If, for example, a current flowing through the output port has a magnitude of 1, a current flowing into the input port has a magnitude of ⅓, a current flowing through each of input capacitors Cn1 and Cn3 has a magnitude of ⅓, a current flowing through input capacitor Cn2 has a magnitude of 0, a current flowing through each of energy storage capacitors C1 to C3 has a magnitude of ⅓, and a current flowing through isolation capacitor C' and a current flowing through the output port have the same magnitude (e.g., 1).

In the circuit shown in FIG. 18, Vcn1+Vcn2+Vcn3=Vin; Vc1−Vc2=Vcn2; Vc2−Vc3=Vcn3; and Vc3+Vc'=Vout. If the voltage regulator is switched between the first and second states at a relatively high frequency, a voltage of the capacitor may not change rapidly among different states. Therefore, parameters in the first state can be substantially the same as those parameters in the second state. Therefore, according to the above equations, Vcn1=Vcn2=Vcn3=Vin/

3; and Vout=Vcn3/2=Vin/6. That is, output voltage Vout of the voltage regulator can, e.g., be ⅙ of the input voltage, which may correspond to the double of the number of the provided input capacitors. Similarly, e.g., in the voltage regulator having a similar structure, output voltage Vout is ½N of input voltage Vin when N energy storage capacitors, the N input capacitors and N input switch circuits are provided, where N is a positive integer. Therefore, a voltage regulator with any step down ratio can be implemented in certain embodiments.

Figure 19:
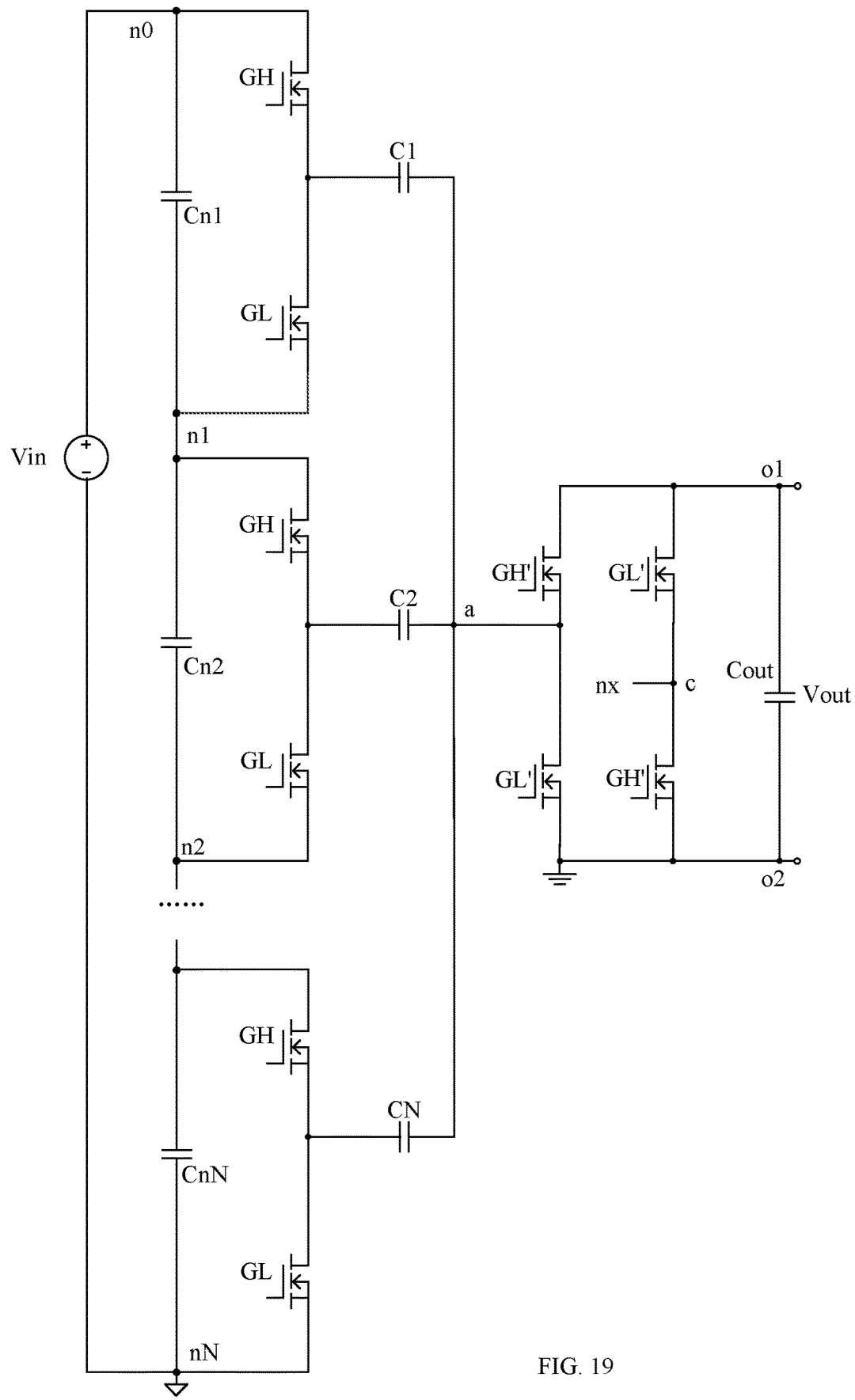
FIG. 19 is a schematic block diagram of a fifth example voltage regulator, in accordance with embodiments of the present invention.

Referring now to FIG. 19, shown is a schematic block diagram of a fifth example voltage regulator, in accordance with embodiments of the present invention. When it is not required to isolate the output port from the input port, the isolation capacitor in the above examples may be avoided, and one node of the output port may be directly connected to a node connected to any one of the N input capacitors, in order to form a current path. As shown, N input capacitors Cn1-CnN, N energy storage capacitors C1-CN, and N input switch circuits are provided in this example. Input capacitors Cn1-CnN may be sequentially connected in series across the input port. One nodes of N energy storage capacitors can connect together, and the other nodes of the N energy storage capacitors can connect to the input switch circuits corresponding to the N energy storage capacitors, respectively. The input switch circuit can selectively couple energy storage capacitor Ci to one of two nodes of input capacitor Cni corresponding to energy storage capacitor Ci.

Also, first and second output switch circuits may also be provided in the voltage regulator. The first output switch circuit can selectively couple node "a" of energy storage capacitors C1-CN to node o1 or node o2 of the output port. The second output switch circuit can selectively couple node "c" to node o1 or o2 of the output port. This example differs in that, the isolation capacitor is not provided, and node "c" and node nx (x=0, 1, 2, . . . N) can connect through a wire or be arranged as one node, in order to directly form a current path. For example, output voltage Vout of the voltage regulator is ½N of input voltage Vin. Similarly, in a voltage regulator implemented without the second output switch circuit, any node of the output port may also be connected to a node connected to any one of the input capacitors through a wire. In this fashion, the number of devices can be reduced, and the area of the circuit can be reduced, when isolation of the input port from the output port is not required for a given application.

It should be understood that, although metal oxide semiconductor field-effect transistor (MOSFET) is used as a switch device in the examples described herein, other types of controlled switch device (e.g., a bipolar transistor [BJT], an insulated gate bipolar transistor ROM etc.), may additionally or alternatively be utilized in one or more of the switches in the voltage regulator of particular embodiments.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A voltage regulator, comprising:
   a) N energy storage capacitors, each having first nodes connected together, wherein N is a positive integer;
   b) N input capacitors connected in series between two nodes of an input port;
   c) N input switch circuits, each being connected in parallel with a corresponding one of the N input capacitors, wherein each of the N input switch circuits comprises first and second input power devices that are coupled in series and configured to selectively couple a second node of a corresponding one of the N energy storage capacitors to a first node or a second node of the corresponding input capacitor;
   d) a first output switch circuit having first and second output power devices coupled in series between two nodes of an output port, and being configured to selectively couple the first nodes of the N energy storage capacitors to a first node or a second node of the output port, wherein the first output switch circuit is not directly connected to any of the N input switch circuits; and
   e) wherein the N input switch circuits and the first output switch circuit are controlled to switch among different states such that an output voltage of the voltage regulator is directly proportional to an input voltage of the voltage regulator, and inversely proportional to the number of the N input capacitors, and wherein the first output power device has a same switching state as each of the first input power devices, and the second output power device has a same switching state as each of the second input power devices.

2. The voltage regulator according to claim 1, wherein the first node or the second node of the output port is configured to be connected to a node that is connected to one of the N input capacitors.

3. The voltage regulator according to claim 1, further comprising an isolation capacitor connected between the second node of the output port and a selected node of the N input capacitors.

4. The voltage regulator according to claim 1, further comprising a second output switch circuit connected in parallel with the first output switch circuit, wherein the second output switch circuit is configured to selectively couple an input node of the second output switch circuit to the first node or the second node of the output port.

5. The voltage regulator according to claim 4, wherein the input node of the second output switch circuit is connected to a node that is connected to one of the N input capacitors.

6. The voltage regulator according to claim 4, further comprising an isolation capacitor connected between the input node of the second output switch circuit and a selected node of the N input capacitors.

7. The voltage regulator according to claim 4, wherein:
   a) the first output switch circuit is a half-bridge circuit comprising third and fourth switches;
   b) the second output switch circuit is a half-bridge circuit comprising fifth and sixth switches;
   c) the third and fourth switches are complementary with each other;
   d) the fifth and sixth switches are complementary with each other; and
   e) the third switch is in the same state as the fifth switch.

8. The voltage regulator according to claim 1, wherein each of the N input switch circuits is a half-bridge circuit comprising first and second switches, wherein the first and second switches are complementary with each other.

9. The voltage regulator according to claim 8, wherein the first output switch circuit is a half-bridge circuit comprising third and fourth switches, wherein the third and fourth switches are complementary with each other, and the third switch is in the same state as the first switch.

10. The voltage regulator according to claim 1, further comprising an output capacitor connected across the output port.

11. The voltage regulator according to claim 1, further comprising an isolation capacitor that is directly connected to at least one of the N input capacitors.

12. The voltage regulator according to claim 1, wherein one input terminal of the first output switch is directly connected to the first nodes of the N energy storage capacitors.

13. The voltage regulator according to claim 1, further comprising an isolation capacitor that is directly connected between ground potentials of the input and output ports.

14. The voltage regulator according to claim 1, further comprising an isolation capacitor that is directly connected to only one of the N input capacitors.

15. The voltage regulator according to claim 1, further comprising an isolation capacitor that is directly connected to only two of the N input capacitors.

16. The voltage regulator according to claim 1, wherein a same arrangement of transistors comprises first and second transistors connected at a common node.

17. The voltage regulator according to claim 1, wherein transistors in the N input switch circuits and the first output switch circuit have a same arrangement and are the only devices therein.

* * * * *